(12) United States Patent
Tiezzi

(10) Patent No.: US 10,800,067 B2
(45) Date of Patent: Oct. 13, 2020

(54) MACHINING CENTRE

(71) Applicant: SCM GROUP S.P.A., Rimini (IT)

(72) Inventor: Giovanni Tiezzi, Sinalunga (IT)

(73) Assignee: SCM Group S.p.A. (IT)

( * ) Notice: Subject to any disclaimer, the term of this patent is extended or adjusted under 35 U.S.C. 154(b) by 1058 days.

(21) Appl. No.: 15/077,233

(22) Filed: Mar. 22, 2016

(65) Prior Publication Data

US 2016/0279875 A1    Sep. 29, 2016

(30) Foreign Application Priority Data

Mar. 23, 2015   (IT) ................ 102015000009508

(51) Int. Cl.
| | |
|---|---|
| *B27M 1/08* | (2006.01) |
| *B27C 9/04* | (2006.01) |
| *B27N 5/00* | (2006.01) |
| *B33Y 10/00* | (2015.01) |
| *B33Y 40/00* | (2020.01) |
| *B33Y 30/00* | (2015.01) |
| *B27N 7/00* | (2006.01) |
| *B27K 5/06* | (2006.01) |
| *B29C 64/188* | (2017.01) |

(52) U.S. Cl.
CPC ............... *B27C 9/04* (2013.01); *B27M 1/08* (2013.01); *B27K 5/06* (2013.01); *B27N 5/00* (2013.01); *B27N 7/005* (2013.01); *B29C 64/188* (2017.08); *B29K 2911/14* (2013.01); *B33Y 10/00* (2014.12); *B33Y 30/00* (2014.12); *B33Y 40/00* (2014.12)

(58) Field of Classification Search
CPC ........................................................ B27M 1/08
See application file for complete search history.

(56) References Cited

U.S. PATENT DOCUMENTS

| | | | |
|---|---|---|---|
| 4,390,564 | A | 6/1983 | Kimble |
| 5,156,700 | A | 10/1992 | Berman et al. |
| 6,995,334 | B1 | 2/2006 | Kovacevic et al. |
| 2005/0173380 | A1 | 8/2005 | Carbone |
| 2017/0113408 | A1 | 4/2017 | Flik et al. |

FOREIGN PATENT DOCUMENTS

| | | |
|---|---|---|
| DE | 4422146 A1 | 1/1994 |
| DE | 102009036413 B3 | 12/2010 |
| EP | 0529816 A1 | 3/1993 |
| EP | 0967067 A1 | 12/1999 |
| EP | 3129209 A1 | 2/2017 |
| WO | 03009951 A2 | 2/2003 |

*Primary Examiner* — Ryan M Ochylski
(74) *Attorney, Agent, or Firm* — Laubscher & Laubscher, P.C.

(57) ABSTRACT

A numerically controlled machining centre is disclosed comprising two workpiece holding tables that are arranged one beside the other and a carriage that is movable on the two tables and carries a first operating unit that is movable according to three machining axes to deposit hardening plasticized material on said tables to form raw workpieces with an additive manufacturing method and a second finishing operating unit having a movable bi-rotative tool-holding head according to three machining axes to remove material from the workpieces formed by the first operating unit.

8 Claims, 4 Drawing Sheets

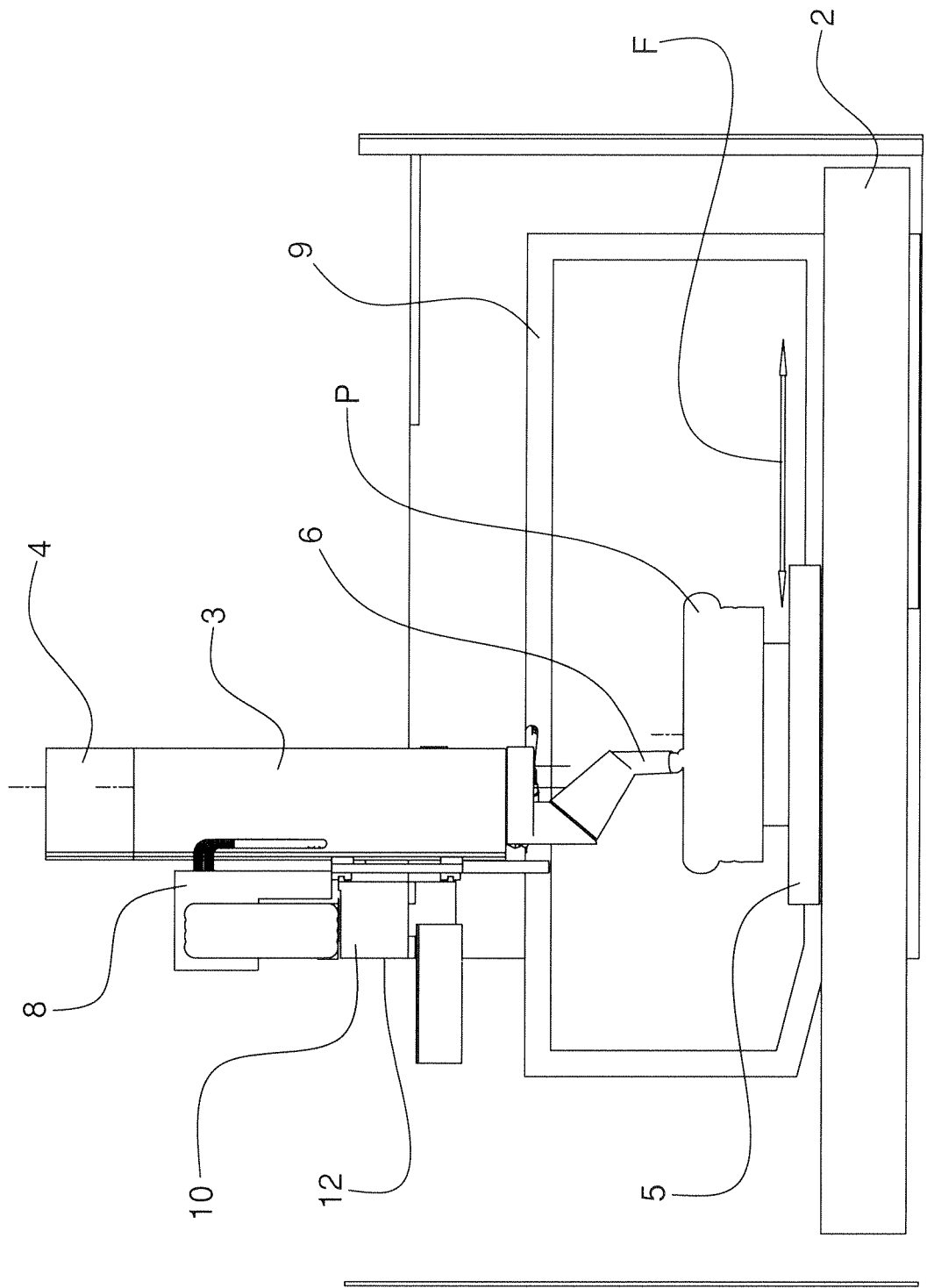

MACHINING CENTRE

BACKGROUND OF THE INVENTION

The invention relates to a machining centre, in particular for machining workpieces made of a hardening plasticized material, for example a hardening polymeric material and/or a hardening composite material and/or an agglomerated material formed by incoherent particles (wood and/or cork and/or glass and/or stone materials, etc) combined with the addition of at least one binding substance.

Specifically, but not exclusively, the machining centre can be usefully used to produce workpieces made of wood that are obtainable by mechanical machining through the removal of material.

Various aspects of prior art numerically controlled machining centres are improvable. Firstly, it would be opportune to optimise the use of the raw material to make a raw workpiece, minimizing both the quantity of material used for the raw workpiece, and the material wasted to make the finished workpiece. Secondly, it is desirable to simplify and accelerate the step of positioning the workpiece in relation to the material-removing tool. It is also desirable that such positioning can be significantly precise. A further improvable aspect is represented by the drawbacks linked to storing and conveying the raw workpieces to be machined in the machining centre by removal of raw material.

SUMMARY OF THE INVENTION

One object of the invention is to overcome one or more of the aforesaid limits and drawbacks of the prior art.

One advantage is making a machining centre that is usable for producing and machining workpieces precisely and efficiently.

One advantage is to combine in a relatively reduced space the function of producing a raw workpiece and of finishing the workpiece.

One advantage is to enable a finished workpiece to be produced from plasticised material in a numerically controlled machining centre.

One advantage is to provide a machining centre in which the step of precise positioning of the workpiece to be machined by removal of material is significantly simplified and accelerated compared with known machining centres.

One advantage is ensuring the precision and finishing that are typical of machining through removal of material.

One advantage is to reduce the quantity of material used for making the raw workpiece to be processed in the machining centre.

One advantage is to reduce material wasted.

One advantage is that operations of storing and conveying the raw workpiece are not necessary as the latter is formed directly in the machining centre, in particular in the same position in which it will then be subjected to finishing machining.

One advantage is to make available a machining centre that is constructionally simple and cheap.

One advantage is to provide a method for producing and machining workpieces through the use of a numerically controlled machining centre.

Such objects and advantages and still others are all achieved by the machining centre according to one or more of the claims set out below.

In one embodiment, a machining centre comprises a workpiece supporting arrangement, at least one forming operating unit that is movable according to one or more machining axes to deposit hardening plasticized material on said supporting arrangement for forming at least one raw workpiece, and at least one finishing operating unit that is movable according to one or more machining axes for removing material from said raw workpiece.

In one embodiment, a machining centre comprises a workpiece supporting arrangement and a carriage that is movable above said supporting arrangement and carries at least one first operating unit that forms a raw workpiece with an additive manufacturing method, and at least a second operating unit that removes material from said raw workpiece.

BRIEF DESCRIPTION OF THE DRAWINGS

The invention can be better understood and implemented with reference to the attached drawings that illustrate an embodiment thereof by way of non-limiting example.

FIG. 4 is a view from the left of FIG. 2.

DETAILED DESCRIPTION

Figure 1:
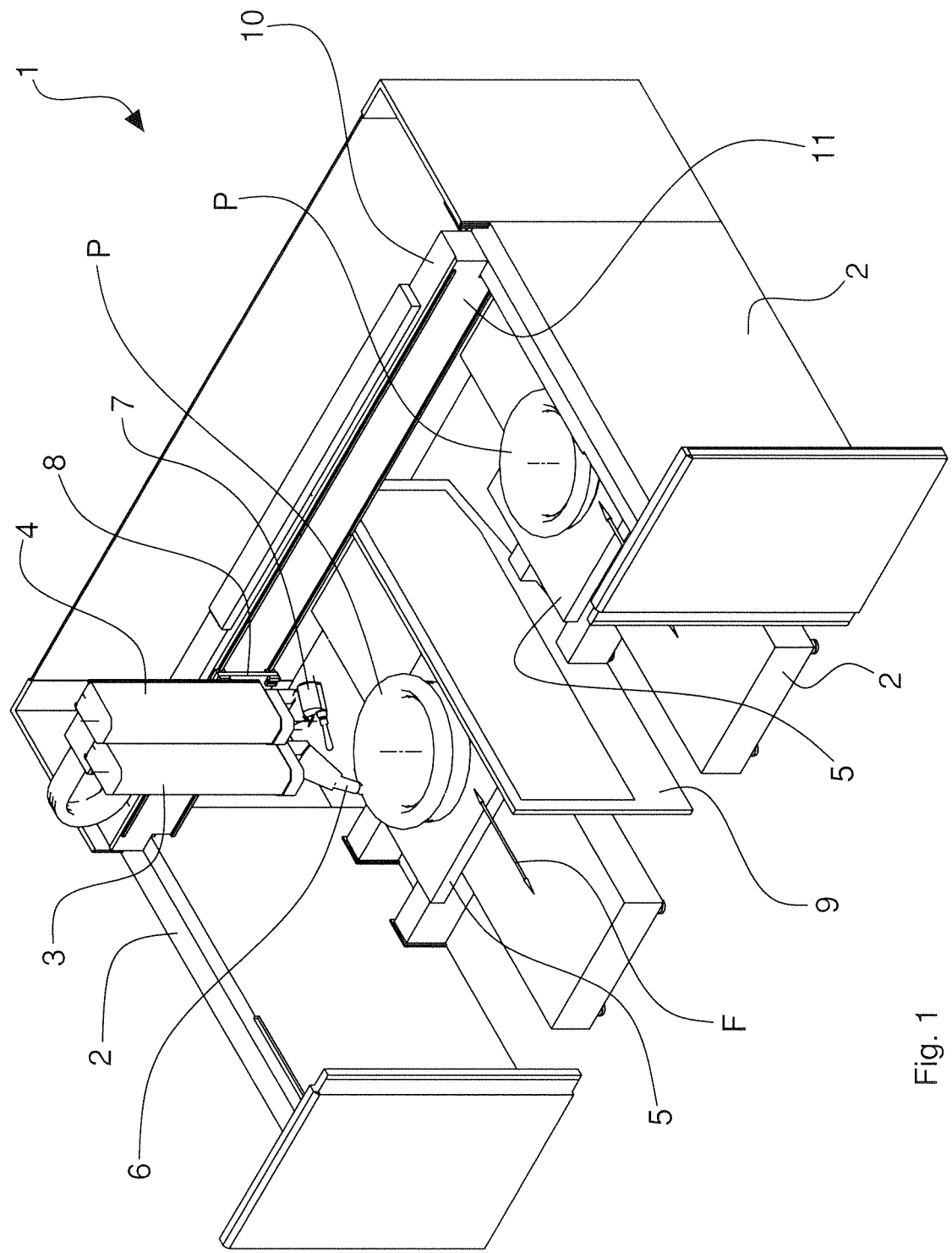
FIG. 1 is a perspective view of an embodiment of a numerically controlled machining centre made according to the invention.
Figure 2:
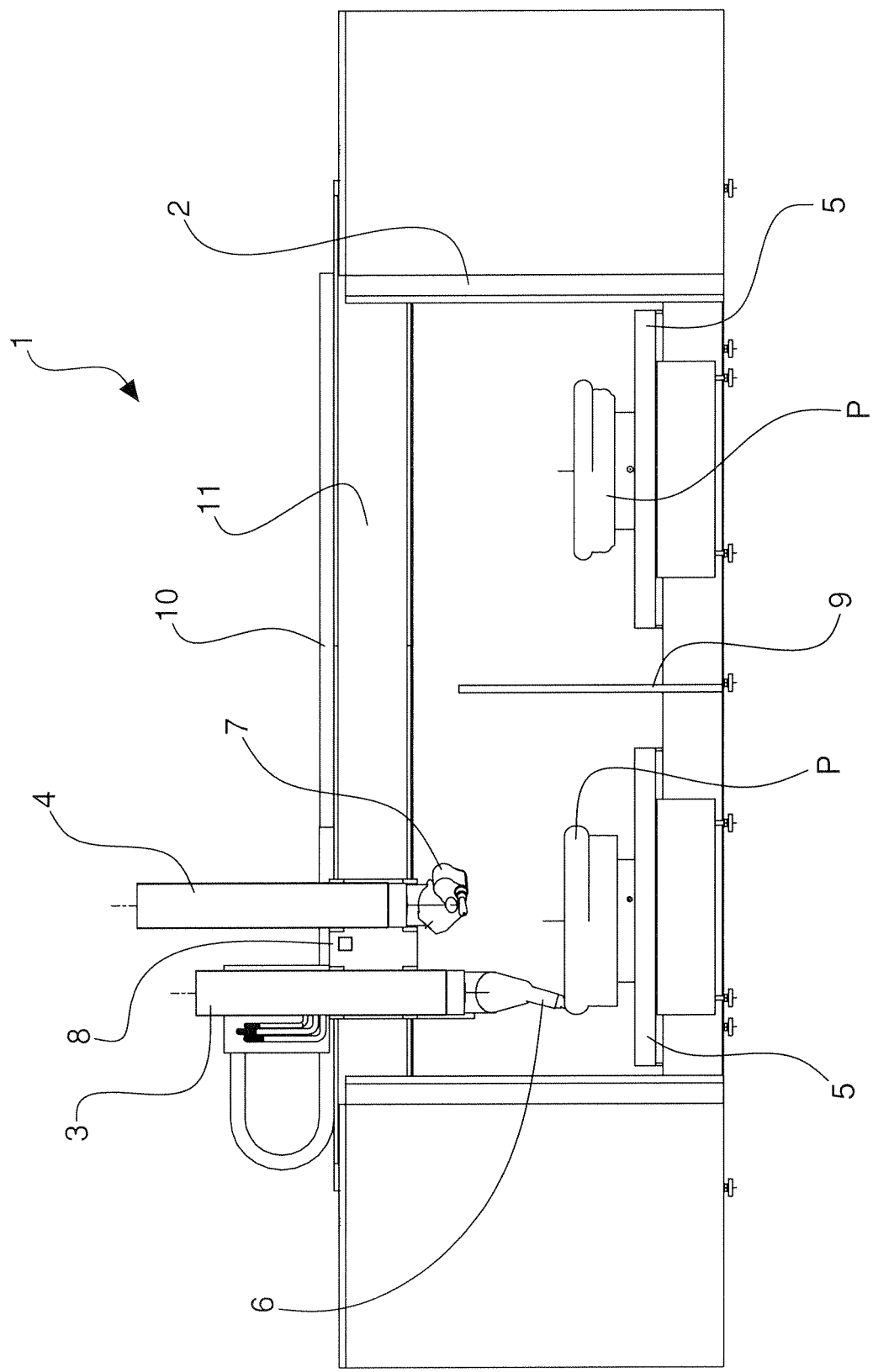
FIG. 2 is a vertical raised view of the machining centre of FIG. 1.
Figure 3:
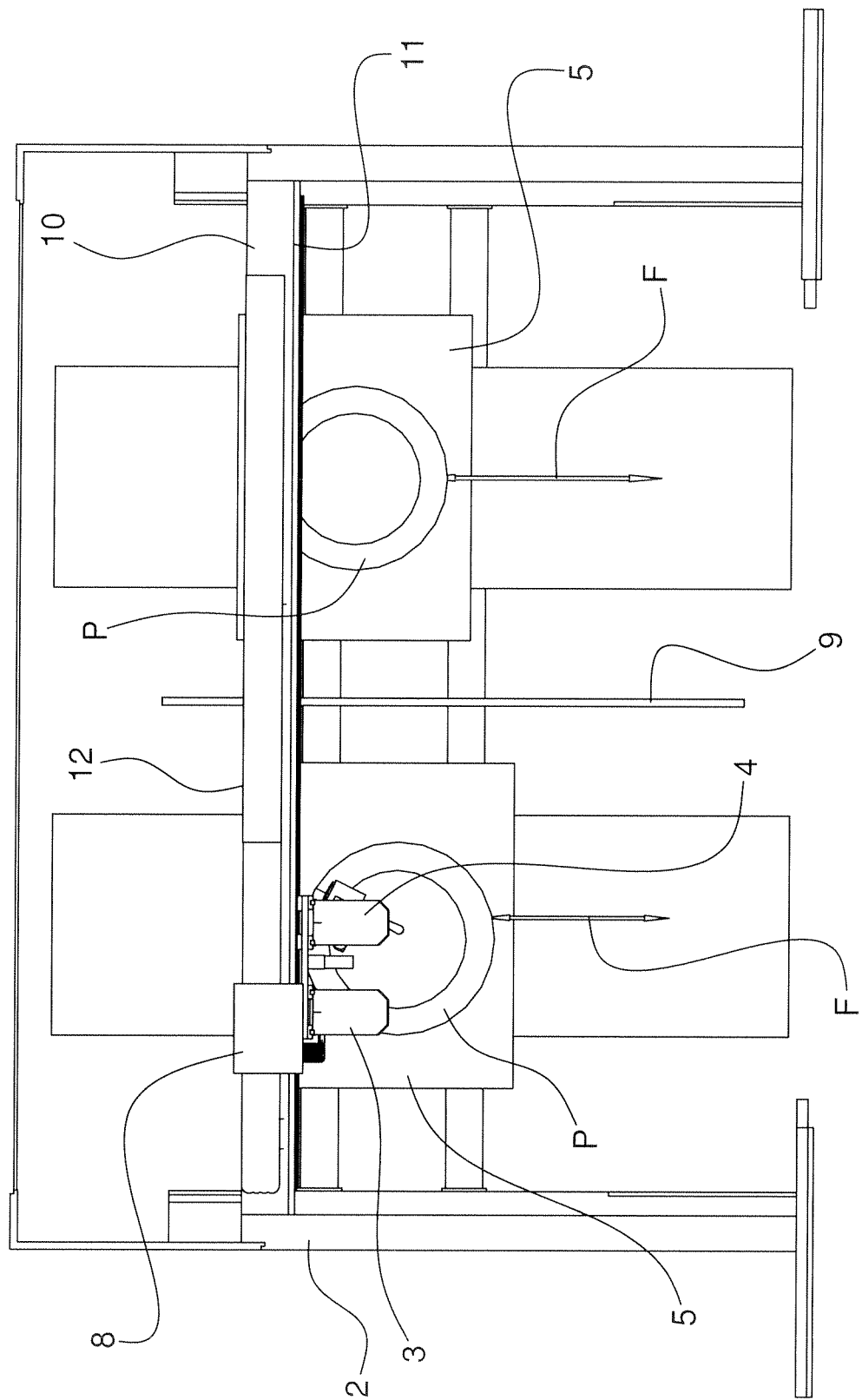
FIG. 3 is a top view of FIG. 2.

With reference to the aforesaid figures, overall with 1 a machining centre has been indicated that is in particular usable to produce workpieces made of wood that are obtainable by mechanical machining through the removal of material. It is in particular possible to produce and machine workpieces made of a hardening plasticized material, for example a hardening polymeric material and/or a hardening composite material and/or an agglomerated material formed by incoherent particles (for example particles made of wood and/or cork and/or glass and/or paper and/or stone, etc) joined together by the addition of at least one binding substance (glue, cement, bitumen, pitch, asphalt, etc) or by sintering. In particular, the hardening plasticized material can comprise a mass of incoherent particles comprising particles of agglomerated wooden material with one binding substance comprising hot melt glue.

The machining centre 1 can comprise at least one framework 2 arranged to support one or more operating units 3 and 4 for machining at least one workpiece P. The framework 2 can comprise, for example, a portal framework. The portal framework can be, in particular, of the movable or fixed portal type.

The machining centre 1 can comprise a workpiece supporting arrangement associated with the aforesaid framework 2 for supporting at least one workpiece P so that the workpiece is reachable by the operating unit/s 3 and/or 4 carried by the framework 2.

The supporting arrangement can comprise, as in this embodiment, at least one workpiece holding table 5 (with a horizontal resting plane). The table 5 can be movable according to a sliding axis F.

The machining centre 1 can comprise, in particular, at least one first operating unit 3 that is movable on the framework according to one or more machining axes (for example three machining axes X, Y, Z). The first operating unit 3 can be arranged, as in this embodiment, to deposit hardening plasticized material on the supporting arrangement to form at least one raw workpiece. The first operating unit 3 can comprise, as in this embodiment, an extruding nozzle 6 that deposits the plasticised material on the workpiece holding table 5 with an additive manufacturing method. The first operating unit 3 can comprise a heating arrangement for heating the material to be dispensed through the extruding nozzle 6. The first operating unit 3 can comprise an extruding device for starting and stopping the flow of material dispensed through the nozzle 6.

The machining centre 1 can comprise, as in this specific embodiment, at least one second operating unit 4 that is movable on the framework 2 according to one or more machining axes (for example three machining axes X, Y, Z). The second operating unit 4 can be arranged, in particular, for removing material from the raw workpiece. The second operating unit 4 can comprise, for example, at least one head 7 with a tool-holding mandrel. It is possible to use various interchangeable tools. The second operating unit 4 can be used, in particular, to perform milling and/or drilling and/or grinding and/or cutting and/or burring and/or sharpening and/or rounding and/or boring tasks and/or still other tasks. The second operating unit 4 can comprise, as in this embodiment, a bi-rotative head 7 (that is adjustable around two rotation axes).

The machining centre 1 can comprise, for example, a carriage 8 that is movable on the framework 2 to carry the first operating unit 3 and/or the second operating unit 4. In the specific case the carriage 8 carries both the operating units 3 and 4. The carriage 8 can be movable, in particular, along one, two or more machining axes.

The supporting arrangement can comprise, as in this embodiment, at least two workpiece holding tables that are arranged one beside the other to both be reachable by the first operating unit 3 and/or by the second operating unit 4. The tables 5 can be movable along two respective sliding axes F that are parallel to one another.

The machining centre 1 can comprise a heating arrangement, in particular a radiation arrangement for heating at least one raw workpiece P formed by the first operating unit 3 on the supporting arrangement, promoting hardening of the workpiece. It is possible to arrange a heating arrangement to heat a workpiece P located on a workpiece holding table 5 and/or to heat another workpiece P situated on another workpiece holding table 5. The heating arrangement can be arranged to heat a workpiece on a table whilst on the other table another workpiece is formed or finished.

The machining centre 1 can comprise, as in this embodiment, at least one (vertical) barrier 9 that is interposed between the two workpiece holding tables 5. The barrier 9 can be used, in particular, to protect a raw workpiece P that is hardening on one of the two workpiece holding tables 5 whereas, for example, another raw workpiece P is being formed or finished on the other of the two tables 5, so that, on the other hand, it can be used to protect a raw workpiece P being formed or finished on a table 5 whereas, for example, another raw workpiece P arranged on the other table 5 is subjected to the heat emitted (for example by radiation) by the heating arrangement to promote hardening of the workpiece.

The framework 2 can comprise, for example, a (horizontal) crosspiece 10 arranged above the two workpiece holding tables 5. The first and second operating unit 3 and 4 can be movable on the crosspiece 10 along a first (horizontal) machining axis. The crosspiece 10 can be fixed, or can be movable along a second machining axis (that is horizontal, perpendicular to the first machining axis). Each workpiece holding table 5 can be movable along a second machining axis (that is horizontal, perpendicular to the first machining axis). The first and the second operating units 3 and 4 can protrude laterally from a first side 11 of the crosspiece 10, as in this embodiment. In other embodiments, it is possible that the first operating unit 3 protrudes laterally from a first side 11 of the crosspiece 10 and the second operating unit 4 protrudes laterally from a second side 12 of the crosspiece 10 opposite the first.

The machining centre 1 can comprise, in one embodiment that is not illustrated, at least one other first operating unit (like the first unit 3) to deposit hardening plasticized material and at least another second operating unit (like the second unit 4) to remove material, such as to have four operating units in the same machining centre, in particular two forming units and two finishing units. It is possible to arrange two pairs of units, wherein each pair is formed of a forming unit and of a finishing unit. Each pair can be carried by a respective carriage (like the carriage 8), so as to have two carriages that are distinct and are controllable independently of one another. These other two operating units (one for forming the raw workpiece and the other for finishing the workpiece) can be movable on the crosspiece 10 and protrude laterally from a second side 12 of the crosspiece 10 opposite the aforesaid first side 11.

A machining method is disclosed that can provide, in particular, using a machining centre 1 according to the invention. This method can comprise, in particular, the step of forming at least one raw workpiece P by depositing hardening plasticized material (by means of a first operating unit 3).

The hardening plasticized material can comprise, in particular, a hardening polymer and/or a hardening composite material and/or an agglomerated material formed by incoherent particles, for example made of wood and/or cork and/or glass and/or stone materials, with the addition of at least one binding substance.

This method can comprise, in particular, after the aforesaid step of forming a raw workpiece P, the step of performing a finish by removal of material from the raw workpiece P (by a second operating unit 4).

The (finishing) second operating unit 4 can machine on a workpiece P that has just been formed in the field of the numerically controlled machining centre 1, so that the (programmable electronic) control device of the machining centre 1 can already know the position of the raw workpiece P to be machined by removal of material. No preliminary step of positioning the workpiece P to be machined by removal of material is thus required. This enables the productivity of the machining centre 1 to be increased without compromising machining precision.

As has been seen, the raw workpiece P can be formed directly in the machining centre 1, by using an additive manufacturing method by at least one first operating unit 3. Storage of the raw workpieces is not necessary, just like conveying and positioning the raw workpieces in the machining centre 1.

The invention claimed is:

1. Machining centre comprising:
   at least one framework;
   a supporting arrangement associated with said framework;
   at least one first operating unit that is movable on said framework in one or more working axes, said first operating unit being arranged to deposit hardening plasticized material on said supporting arrangement to form at least one, raw workpiece;
   at least one second operating unit that is movable on said framework in one or more working axes, said second operating unit being arranged to remove hardening plasticized material from said raw workpiece, said supporting arrangement comprising at least two workpiece holding tables that are arranged one beside the other so that they are both reachable by said first operating unit and/or by said second operating unit; and at least one barrier that is interposed between said two workpiece holding tables to protect raw workpiece that is hardening on one of the two tables while one of forming and finishing of another raw workpiece is occurring on the other of the two tables.

2. Machining centre according to claim 1, comprising a carriage that is movable on said framework to carry said first and second operating units, said carriage being optionally movable in at least one or two machining axes.

3. Machining centre according to claim 1, wherein said second operating unit comprises a bi-rotative head.

4. Machining centre according to claim 1; wherein said supporting arrangement comprises at least one workpiece holding table.

5. Machining centre according to claim 1, comprising a heating arrangement to heat the raw workpiece that is formed on said supporting arrangement promoting the hardening of the raw workpiece.

6. Machining centre according to claim 1, wherein said at least one barrier that is interposed between said two workpiece holding tables to protect a raw workpiece being one of formed and finished on one of the two tables while hardening of another raw workpiece is occurring on the other of the two tables.

7. Machining centre according to claim 1, wherein said framework comprises a horizontal crosspiece arranged above said two workpiece holding tables and wherein said first and second operating units are movable on said crosspiece and laterally protrude from a first side of said crosspiece.

8. Machining centre according to claim 7, comprising at least another first operating unit to deposit hardening plasticized material and at least another second operating unit to remove hardening plasticized material, said another first and second operating units being movable on said crosspiece and laterally protruding from a second side of said crosspiece opposite said first side.

* * * * *